United States Patent [19]
Siddiqui

[11] Patent Number: 5,883,943
[45] Date of Patent: Mar. 16, 1999

[54] CALLING PARTY NAME DELIVERY TO DIGITAL PHONE SUBSCRIBER

[75] Inventor: Aqeel Ahmed Siddiqui, Richardson, Tex.

[73] Assignee: Ericsson Inc., Research Triangle Park, N.C.

[21] Appl. No.: 965,556

[22] Filed: Nov. 6, 1997

[51] Int. Cl.⁶ ............................ H04M 1/56; H04M 15/06
[52] U.S. Cl. .................. 379/142; 379/93.17; 379/93.23; 379/245; 455/415
[58] Field of Search ............................... 379/93.17, 93.23, 379/112, 115, 127, 142, 245, 247, 229; 455/414, 415

*Primary Examiner*—Paul Loomis
*Assistant Examiner*—Binh K. Tieu
*Attorney, Agent, or Firm*—Jenkens & Gilchrist, P.C.

[57] ABSTRACT

A telecommunications system and method for either displaying the calling party name, if available, to the called subscriber at the time of call setup, or informing the called subscriber that a name query is being performed if the calling party name is not available at call setup. If the calling party name is not available at the time of setting up of the call, the call is setup with the display reading "Searching Name". This gives the option to the subscriber to either pick up the call without the name information, or to wait for the name information to arrive. If the name is found, it will be displayed as such; if not, the display will read "out-of-area" (or other similar message). Advantageously, embodiments of the present invention do not increase the call setup time, while at the same time, the called subscriber has the option to wait for the Calling Party Name query response.

35 Claims, 6 Drawing Sheets

| bit | | | | | | | | Oct | Meaning |
|---|---|---|---|---|---|---|---|---|---|
| 8 | 7 | 6 | 5 | 4 | 3 | 2 | 1 | | |
| 0 | 0 | 0 | 1 | 1 | 1 | 0 | 0 | 1 | Facility IE |
| 0 | 0 | 0 | 0 | 0 | 0 | 1 | 0 | 2 | Length |
| 1 | 0 | 0 | 1 | 0 | 0 | 0 | 1 | 3 | Supp. services |
| 1 | 0 | 1 | 0 | 1 | x | x | x | 4 | CNAM info, Searching |

*FIG. 5A*

| bit | | | | | | | | Oct | Meaning |
|---|---|---|---|---|---|---|---|---|---|
| 8 | 7 | 6 | 5 | 4 | 3 | 2 | 1 | | |
| 0 | 0 | 0 | 1 | 1 | 1 | 0 | 0 | 1 | Facility IE |
| 0 | 0 | 0 | 0 | 0 | 0 | 1 | 1 | 2 | Length |
| 1 | 0 | 0 | 1 | 0 | 0 | 0 | 1 | 3 | Supp. services |
| 1 | 0 | 1 | 0 | 0 | 1 | x | x | 4 | CNAM info, Not searching Name not avail |

*FIG. 5B*

| bit | | | | | | | | Oct | Meaning |
|---|---|---|---|---|---|---|---|---|---|
| 8 | 7 | 6 | 5 | 4 | 3 | 2 | 1 | | |
| 0 | 0 | 0 | 1 | 1 | 1 | 0 | 0 | 1 | Facility IE |
| 0 | 0 | 0 | 0 | 0 | 0 | 1 | 1 | 2 | Length |
| 1 | 0 | 0 | 1 | 0 | 0 | 0 | 1 | 3 | Supp. services |
| 1 | 0 | 1 | 0 | 0 | 0 | 0 | 1 | 4 | CNAM info, Not searching Name avail but restr |

FIG. 5C

| bit | | | | | | | | Oct | Meaning |
|---|---|---|---|---|---|---|---|---|---|
| 8 | 7 | 6 | 5 | 4 | 3 | 2 | 1 | | |
| 0 | 0 | 0 | 1 | 1 | 1 | 0 | 0 | 1 | Facility IE |
| 0 | 0 | 0 | 0 | 1 | 0 | 1 | 0 | 2 | Length |
| 1 | 0 | 0 | 1 | 0 | 0 | 0 | 1 | 3 | Supp. services |
| 1 | 0 | 1 | 0 | 0 | 0 | 0 | 0 | 4 | CNAM info, Not searching name avail but restr |
| 0 | 1 | 0 | 0 | 1 | 0 | 1 | 0 | 5 | J (4AH) |
| 0 | 0 | 1 | 0 | 1 | 1 | 1 | 0 | 6 | . (2EH) |
| 0 | 0 | 1 | 0 | 0 | 0 | 0 | 0 | 7 | Space (20H) |
| 0 | 1 | 0 | 1 | 0 | 0 | 1 | 1 | 8 | S (53H) |
| 0 | 1 | 0 | 0 | 1 | 1 | 0 | 1 | 9 | M (4DH) |
| 0 | 1 | 0 | 0 | 1 | 0 | 0 | 1 | 10 | I (49H) |
| 0 | 1 | 0 | 1 | 0 | 1 | 0 | 0 | 11 | T (54H) |
| 0 | 1 | 0 | 0 | 1 | 0 | 0 | 0 | 12 | H (48H) |

FIG. 5D

CALLING PARTY NAME DELIVERY TO DIGITAL PHONE SUBSCRIBER

BACKGROUND OF THE PRESENT INVENTION

1. Field of the Invention

The present invention relates generally to telecommunications systems and methods for providing a calling party name to a called subscriber having a digital phone, and specifically to handling the calling party name delivery and displaying a message indicating that a name search is being performed to a digital phone subscriber when the name is not available at the time of call setup.

2. Background and Objects of the Present Invention

In modern telecommunications networks, signaling constitutes the distinct control infrastructure that enables provision of all other services. The system which provides this signaling is known as Signaling System #7 (SS7). It can be defined as the system that enables stored program control exchanges, network databases, and other "intelligent" nodes of the network to exchange: (a) messages related to call setup, supervision, and tear-down; (b) information needed for distributed applications processing (inter-process query/response); and (c) network management information.

In addition, the Intelligent Network (IN) and the new Advanced Intelligent Network (AIN) have made possible the transfer of all types of information through the telephone network without special circuits or long installation cycles. The IN consists of a series of intelligent nodes, each capable of processing at various levels, and each capable of communicating with one another over data links. The basic infrastructure needed is composed of various signaling points, which perform both message discrimination (read the address and determine if the message is for that node), and route messages to other signaling points. The basic three types of signaling points are: (1) Service Switching Points (SSPs); (2) Signaling Transfer Points (STPs); and (3) Service Control Points (SCPs), each of which are described in more detail hereinafter.

With reference now to FIG. 1 of the drawings, the many Service Switching Points (SSPs) 100 serve as the local exchanges in a telephone network 90, a portion of which is shown in FIG. 1. The SSPs 100 also provide an Integrated Services Digital Network (ISDN) interface for the Signaling Transfer Points (STPs) 110, as is understood in the art. The ISDN protocol was first offered in the 1980's to subscribers as an intelligent interface, compatible with the IN, which offers the same services and intelligence as the IN.

The STP 110 serves as a router, and switches messages received from a particular SSP 100 through the network 90 to their appropriate destinations (another SSP 100). As is also understood in the art, the STP 110 receives messages in packet form from the SSPs 100. These packets are either related to call connections or database queries. If the packet is a request to connect a call, the message must be forwarded to a destination end office (another SSP 100), where the call will be terminated.

If, however, the message is a database query seeking additional information, the destination will be a database. Database access is provided through the Service Control Point (SCP) 120, which does not store the information, but acts as an interface to a computer that houses the requested information.

Another type of network, which can be implemented with the SS7 network, is the cellular network. Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio systems.

As shown in FIG. 2 of the drawings, the GSM cellular network comprises two different segments: the radio segment and the switching segment. The radio segment consists of a Mobile Station 205, e.g., the cellular telephone or transceiver itself, which is used by mobile subscribers to communicate with the cellular network 215, other mobile subscribers, and users outside the subscribed network, both wireline and wireless, and an antenna system, e.g., a Base Station System (BSS). The BSS consists of at least one Base Transceiver Station (BTS) 210, which is the physical equipment, e.g., a radio tower, that provides radio coverage to the geographical part of a cell 200 for which it is responsible. The BSS also includes a Base Station Controller (BSC) 220 connected to the BTSs 210 to serve as an interface between the radio segment and the switching segment.

The switching segment consists of a Mobile Services Switching Center (MSC) 230, which is in communication with the Base Station Controllers (BSCs) 220 via an A-bis interface 225, which is a 64-kbps digital link. The MSC 230 transmits data and other signaling information from the BSS 210/220 to the Public Switched Telephone Network (PSTN) 270 (wireline network) and to other entities within the cellular network 215.

One such entity is the Home Location Register 250, which is a database within the cellular network 215 used to store the subscriber information for all subscribers within the home service area of the service provider, e.g., user profiles, current location information, International Mobile Subscriber Identity (IMSI) numbers, and other administrative information. The HLR 250 may be co-located with a given MSC 230, integrated with the MSC 230, or alternatively can service multiple MSCs 230, the latter of which is illustrated in FIG. 2.

The VLR 240 is a database containing information about all of the Mobile Stations 205 currently located within the MSC/VLR area 230/240. If a MS 205 roams into a new MSC/VLR area 230/240, the VLR 240 connected to that MSC 230 will request data about that Mobile Station 205 from the HLR database 250 (simultaneously informing the HLR 250 about the current location of the MS 205). Accordingly, if the user of the MS 205 then wants to make a call, the local VLR 240 will have the requisite identification information without having to reinterrogate the HLR 250. In the aforedescribed manner, the VLR and HLR databases 240 and 250, respectively, contain various subscriber information associated with a given MS 205.

In order to send and receive calls between a mobile subscriber and a wireline subscriber, the cellular network 215 must be connected to the Public Switched Telephone Network (PSTN) 270. The signaling information used to request service and connect calls to and from the PSTN 270 is sent through the SS7 network. The MSC 230 connects to the SS7 network via a Signaling Transfer Point (STP) 260, which also allows digital cellular network providers to access various databases within the IN.

One feature that many digital service operators provide is caller identification. For digital phone subscribers, whether wireline, e.g., ISDN, or wireless, the calling party name and number information is typically sent to the subscriber with the first ring. However, in some cases, the name information is not available at the time of call setup. Thus, a query, e.g., to the SCP 120, must be performed to search for the name. Unfortunately, this query process can potentially take up to six seconds.

Existing technology has only provided two possible solutions for this situation where the name is not available at the time of setting up a call: (a) setup the call without the name, and display "out-of-area"; or (b) wait for the name query response, if it becomes available, and then setup the call with the calling party name. If the calling party name does not become available, even after a name query, the call can then be setup by displaying "out of area".

The Bellcore recommendation, Generic Requirement for ISDN Calling Name Identification Services, GR-1367-CORE, Issue 1, Jul. 1994, addresses the protocol of Calling Party Name Delivery over Primary Rate Interface (PRI) for ISDN. PRI is a class of ISDN service designed for larger businesses with a larger call volume that provides twenty-three 64-kbps bearer channels and one 64-kbps signaling channel. The protocol discusses the delivery of the calling party name to the subscriber, but it does not address the problem of handling call setup when the name is not initially available.

Therefore, a protocol is needed for the delivery of the calling party name when the name is not available at call setup. This includes defining the message, the information element (IE) within the message, and the structure of the IE. For example, the Bellcore recommendation for ISDN subscribers includes the Calling Party Name in a Facility Information Element (IE) in either a SETUP message, or in a separate message, such as a FACILITY message, following the SETUP message. However, the Bellcore recommendation does not address the structure of the Facility IE. Thus, the structure of the Facility IE must be defined in order to deliver the calling party name in either the SETUP message or the FACILITY message.

It is therefore an object of the invention to inform the called subscriber of a digital phone that a name query is being performed when the calling party name is not available at call setup.

It is a further object of the invention to include either the Calling Party Name, a "not available" message, a "private" message, or a "searching name" message in an initial message from the called party's end office to the called party.

It is still a further object of the invention to define the structure of a Facility Information Element for ISDN subscribers in, for example, either a SETUP message or a FACILITY message, to send the calling party name information as well as the status of the name query to the called subscriber.

SUMMARY OF THE INVENTION

The present invention is directed to telecommunications systems and methods for either displaying the calling party name, if available, to the called subscriber of a digital phone at the time of call setup, or informing such called subscriber that a name query is being performed if the calling party name is not available at call setup. If the calling party name is not available at the time of setting up of the call, the call is setup with the display "Searching Name". This gives the subscriber the option to either pick up the call without the name information, or to wait for the name information to arrive. If the actual name of the calling party is found, it will be displayed as such, if not, the display will read "out-of-area" (or other similar message). Advantageously, embodiments of the present invention do not increase the call setup time, while allowing the called subscriber of a digital phone the option of waiting for the Calling Party Name query response.

BRIEF DESCRIPTION OF THE DRAWINGS

The disclosed inventions will be described with reference to the accompanying drawings, which show important sample embodiments of the invention and which are incorporated in the specification hereof by reference, wherein:

FIGS. 5A–5D are tables showing the composition of sample Facility Information Elements for various scenarios.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
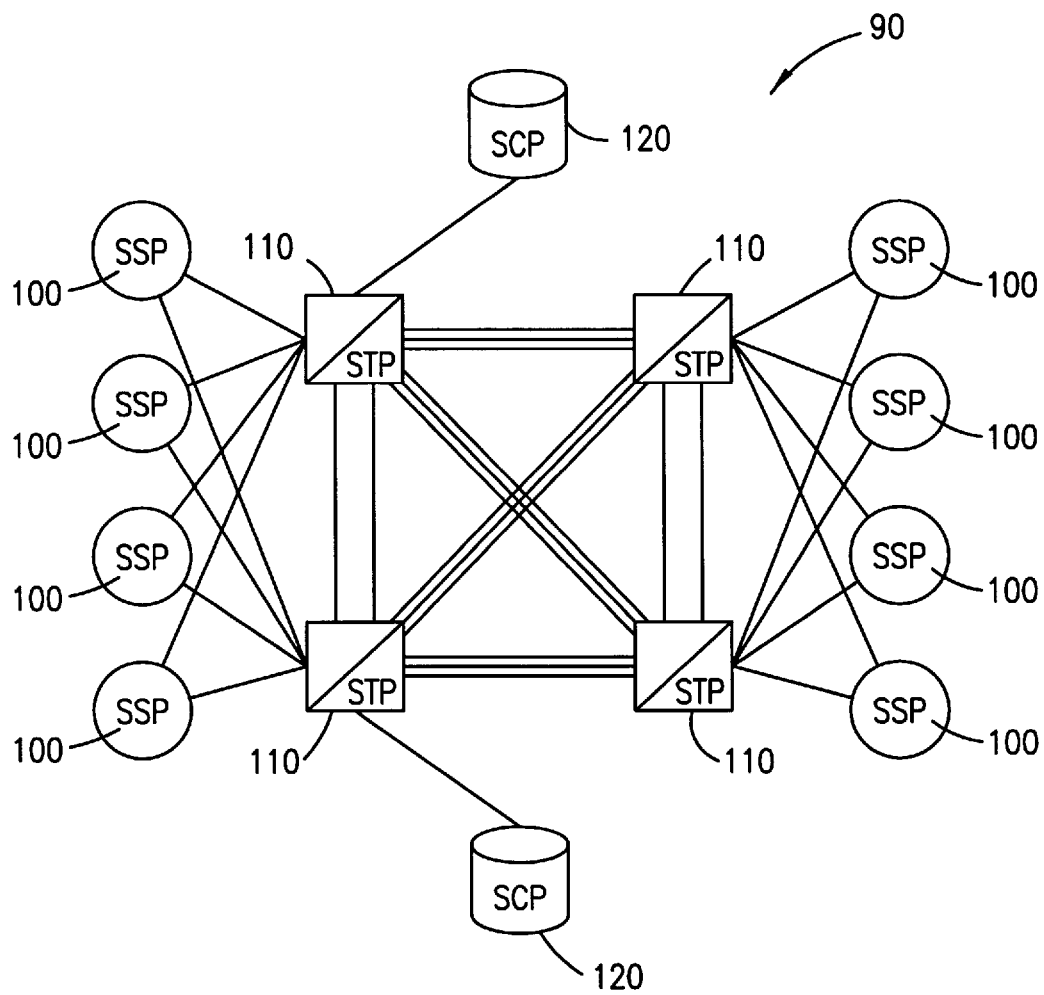
FIG. 1 is a block diagram illustrating some of the basic components used in an Intelligent Network or an Advanced Intelligent Network for signal switching.
Figure 2:
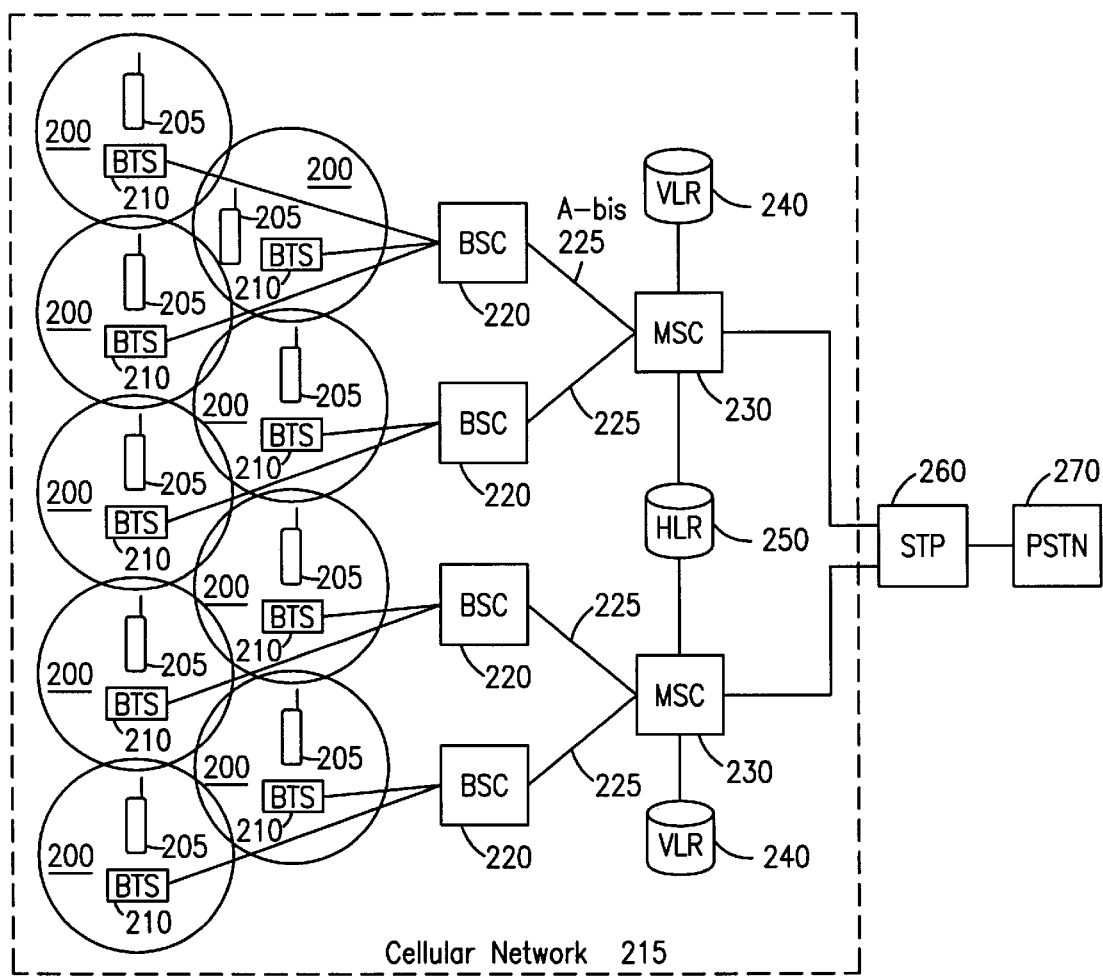
FIG. 2 is a block diagram of a conventional terrestrially-based wireless telecommunications system connected to the Intelligent Network.
Figure 3:
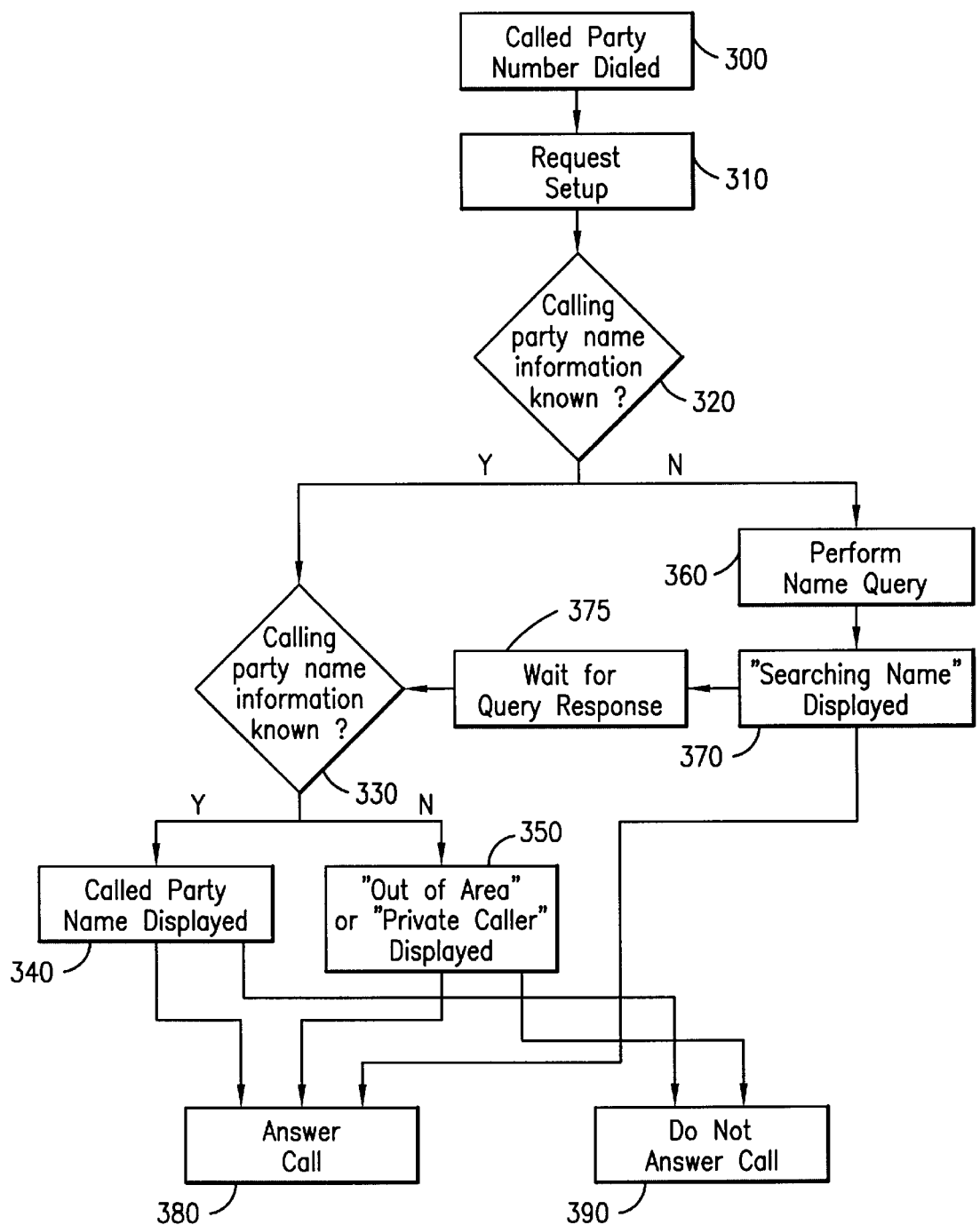
FIG. 3 is flow chart illustrating sample steps for displaying to the called subscriber of a digital phone either calling party name information, if available, or a message indicating that a name query is being performed.

With reference now to FIG. 3 of the drawings, in preferred embodiments of the present invention, for digital phone subscribers (wireline or wireless) who have purchased a caller identification service, after the calling party has dialed the called party number (step 300), a request is made to the network 90 or 215 to setup a connection between the calling party and the called party (step 310). At this time, the end office serving the called subscriber, e.g., an SSP 100 or an MSC 230, determines whether the calling party name and number information can be included in the call setup message to the digital phone of the called subscriber (step 320). The calling party number is typically included within the first message from the calling party's end office to the called subscriber's end office, e.g., within an Initial Address Message (IAM) used in the SS7 network 90, or when sending a page request to a MS 205, which is a broadcast message to the MS 205 instructing the MS 205 to respond, e.g., by sending a CM SERVICE REQUEST message. However, the calling party name information associated with the calling party number is typically only found in the called subscriber's end office 100 or 230.

Thereafter, the calling party name and number information, if available (step 330), is displayed (step 340) to the called subscriber to allow the called subscriber the option of answering the call (step 380) or not answering the call (step 390). Typically, this information is delivered on the first ring for ISDN subscribers. If the calling party name information is not available (step 330), either because the calling party has a restricted service which does not allow the calling party name and number information to be displayed to the called party, or the calling party is not within an area which provides caller identification services, the display to the called party will read "private caller", "out-of-area", or other similar message (step 350).

Figure 4A:
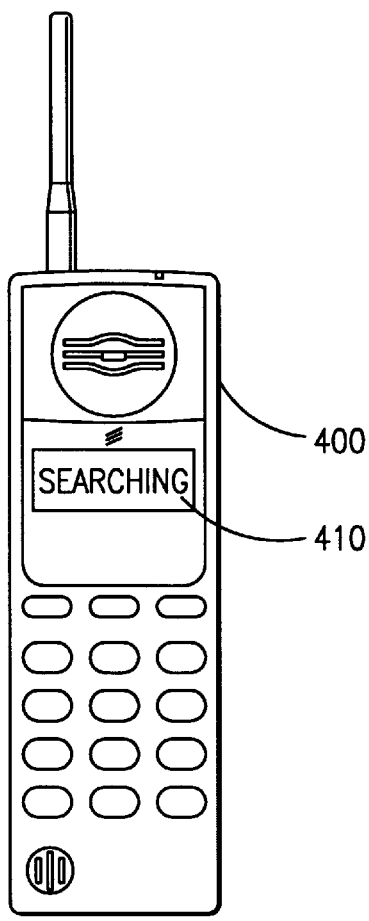
FIGS. 4A and 4B illustrate displays used for caller identification.
Figure 4B:
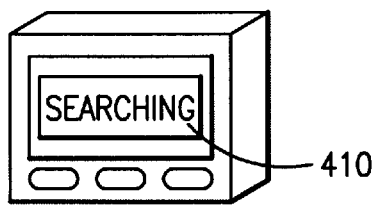

However, if the calling party name information (either the name, a "not available" message, or a "private" message) is not known by the called subscriber's end office 100 or 230 at the time of call setup (step 320), a name query must be performed (step 360) to determine the calling party name information. Therefore, during the time that the name query is being performed, the called subscriber's display 410, shown in FIGS. 4A and 4B, which can be implemented on the phone 400 itself, as indicated in FIG. 4A, or can be a separate box 410, illustrated in FIG. 4B, will read "Searching Name" (step 370), which indicates to the called subscriber that a name query is occurring. The called subscriber then has the option of answering the call (step 380) and not waiting for the query response, or waiting for the query response (step 375) to return to the end office with the calling party name information (step 330), and then for this calling party name information to be displayed (step 340 or step 350) before deciding whether or not to answer the call (step 380 or step 390 respectively).

In accordance with the Bellcore recommendations for ISDN (PSTN) subscribers, the calling party name information and the indication of the performance of a name query is preferably carried in, for example, a Facility Information Element (IE). As an example, for ISDN subscribers, there are two possible messages in which the Facility IE with calling party name information can be sent: the SETUP message or the FACILITY message.

If the calling party name information is to be sent in the SETUP message, the Facility IE is coded with a service identifier, "not searching", which signifies that the calling party name information is included, and therefore no search needs to be performed. Thus, the called subscriber's display will read the calling party name and number information, which indicates to the subscriber that no further calling party name information should be expected from the network.

In an alternative embodiment, the calling party name information can be coded in the Facility IE in a FACILITY message sent after the SETUP message. However, when the calling party name cannot be located by the called subscriber's end office at the time of call setup, a name query must be sent to a centralized database, e.g., a query can be sent to a SCP with access to a database housing the calling party name information. In this situation, to avoid a delay in sending the SETUP message, the SETUP message can be sent either without a Facility IE, in which case the called subscriber's display will not display any name information at the time of setting up of the call, or with a Facility IE with a service identifier indicating that a name query is being performed, e.g., the service identifier is set to a searching mode, in which case the called subscriber's display will read "Searching Name". At this point, the subscriber is free to either pick up the call, or wait for the calling party name information to arrive. If the called subscriber chooses to wait for the information, the display will be cleared and re-written when the FACILITY message, which includes a Facility IE having the calling party name information (either the name, a "not available" message, or a "private" message), arrives.

In preferred embodiments of the present invention, there are four potential forms that the Facility IE can take for the delivery of the calling party name. In a first case, as illustrated in FIG. 5A, a name query must be performed for the calling party name, and thus the service identifier in the Facility IE in the initial message to the called subscriber's digital phone, e.g., the SETUP message, is set to a searching mode. For this situation, the Facility IE is composed of only four octets, as shown in FIG. 5A, where "x" indicates that either a "1" or a "0" can be placed in that bit. This form of Facility IE instructs the called subscriber's display to read "Searching Name". Thereafter, the calling party name information, once obtained, will be sent in the Facility IE in the FACILITY message, which can take the form of the actual calling party name, a "Name not Available" message, or a "Private Caller" message, all of which are discussed hereinbelow.

In a second scenario, the actual calling party name is not available and no search has to be performed. In this situation, the Facility IE is again composed of four octets, as shown in FIG. 5B, but no name characters are sent in this Facility IE, and the called subscriber's display reads "Out-of-Area". This Facility IE can be sent in either the SETUP message or the FACILITY message.

In a third situation, the actual calling party name is available, but the calling party has restricted the identification of the calling party name information. In this case, as shown in FIG. 5C, no name characters are sent in the Facility IE, and the called subscriber's display reads "Private", or other similar message. This Facility IE can be sent in either the SETUP message or the FACILITY message.

In a final scenario, the calling party name is available and allowed. For this case, the Facility IE will include the four octets, as described hereinbefore, plus an octet for each character to be displayed, as shown in FIG. 5D. The called subscriber's display will therefore display the name characters sent in the Facility IE. As an example, FIG. 5D corresponds to the Facility IE for the name "J. SMITH". Once again, this Facility IE can be sent in either the SETUP message or the FACILITY message.

As will be recognized by those skilled in the art, the innovative concepts described in the present application can be modified and varied over a wide range of applications. Accordingly, the scope of patented subject matter should not be limited to any of the specific exemplary teachings discussed.

For example, the calling party name information, including the indication of "Searching Name", can be sent to the called subscriber's display using a number of different messages, instead of the SETUP and FACILITY messages discussed herein, depending upon the protocol used. Furthermore, the calling party name information can be coded in a different information element, instead of the Facility IE of the presently preferred embodiment.

What is claimed is:

1. A telecommunications system for providing calling party name information associated with a calling party to a called subscriber, said telecommunications system comprising:

an information element containing a service identifier therein;

an end office in communication with a digital phone of said called subscriber, said calling party name information being included in said information element when said calling party name information is available to said end office;

transmission means for transmitting said information element from said end office to said digital phone; and display means for displaying said calling party name information and said service identifier to said called subscriber of said digital phone, said service identifier being set to a searching mode when said calling party name information is not available to said end office during the setup of a call between said calling party and said called subscriber.

2. The telecommunications system of claim 1, wherein said digital phone of said called subscriber is interfaced with an Integrated Services Digital Network line.

3. The telecommunications system of claim 1, wherein said digital phone is a mobile station.

4. The telecommunications system of claim 1, wherein said end office is a Service Switching Point.

5. The telecommunications system of claim 1, wherein said end office is a mobile services switching center.

6. The telecommunications system of claim 1, wherein said calling party name information is set to "out of area".

7. The telecommunications system of claim 1, wherein said calling party name information is set to "private caller".

8. The telecommunications system of claim 1, wherein said calling party name information is set to the actual name of said calling party.

9. The telecommunications system of claim 1, wherein said information element is a Facility Information Element.

10. The telecommunications system of claim 9, wherein said Facility Information Element is carried in a SETUP message from said end office to said digital phone.

11. The telecommunications system of claim 1, wherein said service identifier is set to a non-searching mode and said calling party name information is included in said information element when said calling party name information is available to said end office during the setup of said call.

12. The telecommunications system of claim 11, wherein said information element is a Facility Information Element, said Facility Information Element being carried in a SETUP message from said end office to said digital phone.

13. The telecommunications system of claim 11, wherein said information element is a Facility Information Element, said Facility Information Element being carried in a FACILITY message from said end office to said digital phone.

14. The telecommunications system of claim 1, further comprising an updated information element transmitted from said end office to said digital phone, said updated information element containing said calling party name information when said calling party name information becomes available to said end office after the setup of said call.

15. The telecommunications system of claim 14, wherein said updated information element is a Facility Information Element, said Facility Information Element being carried in a FACILITY message from said end office to said digital phone.

16. The telecommunications system of claim 1, wherein said display means consists of a display within said digital phone.

17. The telecommunications system of claim 1, wherein said display means consists of a display in communication with said end office, said display not being attached to said digital phone.

18. A method for providing calling party name information associated with a calling party to a called subscriber within a telecommunications system, said method comprising the steps of:

setting up a call between said calling party and said called subscriber, using an end office within said telecommunications network, said end office being in communication with a digital phone of said called subscriber;

performing, by said end office, a calling party name query when said calling party name information is unavailable to said end office during said step of setting up;

transmitting, by said end office, a first information element to said digital phone, said first information element containing a service identifier therein, said service identifier being set to a searching mode during said step of performing said calling party name query, said service identifier being displayed to said called subscriber of said digital phone; and transmitting an updated information element from said end office to said digital phone after said step of performing, said updated information element containing said calling party name information, said calling party name information being displayed to said called subscriber.

19. The method of claim 18, wherein said digital phone of said called subscriber is interfaced with an Integrated Services Digital Network line.

20. The method of claim 18, wherein said digital phone is a mobile station.

21. The method of claim 18, wherein said end office is a Service Switching Point.

22. The method of claim 18, wherein said end office is a mobile services switching center.

23. The method of claim 18, wherein said calling party name information is set to "out of area".

24. The method of claim 18, wherein said calling party name information is set to "private caller".

25. The method of claim 18, wherein said calling party name information is set to the actual name of said calling party.

26. The method of claim 18, wherein said first information element is a Facility Information Element.

27. The method of claim 26, wherein said Facility Information Element is carried in a SETUP message from said end office to said digital phone, said SETUP message carrying only said first information element.

28. The method of claim 18, further comprising the step of: before said step of performing, transmitting said first information element from said end office to said digital phone when said calling party name information is available to said end office during said step of setting up said call, said service identifier being set to a non-searching mode, said calling party name information being included in said first information element, said calling party name information and said service identifier being displayed to said called subscriber.

29. The method of claim 28, wherein said first information element is a Facility Information Element, said Facility Information Element being carried in a SETUP message from said end office to said digital phone.

30. The method of claim 28, wherein said first information element is a Facility Information Element, said Facility Information Element being carried in a FACILITY message from said end office to said digital phone.

31. The method of claim 18, wherein said updated information element is a Facility Information Element, said Facility Information Element being carried in a FACILITY message from said end office to said digital phone.

32. The method of claim 18, wherein said calling party name information and said service identifier are displayed on a display within said digital phone.

33. The method of claim 18, wherein said calling party name information and said service identifier are displayed on a display in communication with said end office, said display not being attached to said digital phone.

34. The method of claim 18, further comprising the step of: after said step of transmitting said first information element, answering said call by said called subscriber, said calling party name information not being displayed to said called subscriber.

35. The method of claim 18, further comprising the step of: after said step of transmitting said updated information element, answering said call by said called subscriber.

\* \* \* \* \*